(12) United States Patent
Isele

(10) Patent No.: US 11,699,062 B2
(45) Date of Patent: Jul. 11, 2023

(54) SYSTEM AND METHOD FOR IMPLEMENTING REWARD BASED STRATEGIES FOR PROMOTING EXPLORATION

(71) Applicant: Honda Motor Co., Ltd., Tokyo (JP)

(72) Inventor: David Francis Isele, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 290 days.

(21) Appl. No.: 16/910,417

(22) Filed: Jun. 24, 2020

(65) Prior Publication Data

US 2021/0070325 A1    Mar. 11, 2021

Related U.S. Application Data

(60) Provisional application No. 62/897,242, filed on Sep. 6, 2019.

(51) Int. Cl.
| | | |
|---|---|---|
| *G06N 3/006* | (2023.01) | |
| *B60W 60/00* | (2020.01) | |
| *G06N 3/08* | (2023.01) | |
| *G06V 20/56* | (2022.01) | |
| *G06F 18/214* | (2023.01) | |
| *G06V 10/778* | (2022.01) | |
| *G06V 10/80* | (2022.01) | |

(52) U.S. Cl.
CPC ....... *G06N 3/006* (2013.01); *B60W 60/00272* (2020.02); *B60W 60/00274* (2020.02); *G06F 18/214* (2023.01); *G06N 3/08* (2013.01); *G06V 10/7788* (2022.01); *G06V 10/803* (2022.01); *G06V 20/56* (2022.01); *G06V 20/588* (2022.01); *B60W 2420/52* (2013.01); *B60W 2554/4049* (2020.02)

(58) Field of Classification Search
CPC ..... B60W 60/00272; B60W 60/00274; B60W 2554/4049; B60W 2420/52; G06V 20/588; G06K 9/6256; G06N 3/08
USPC ......................................................... 701/23
See application file for complete search history.

(56) References Cited

U.S. PATENT DOCUMENTS

| | | | | |
|---|---|---|---|---|
| 2020/0191574 | A1* | 6/2020 | Banino | G06N 3/04 |
| 2020/0200556 | A1* | 6/2020 | Boston | G01C 21/3644 |
| 2020/0327405 | A1* | 10/2020 | Gendron-Bellemare | G06N 3/0472 |
| 2020/0372366 | A1* | 11/2020 | Badia | G06N 3/088 |

(Continued)

OTHER PUBLICATIONS

Schultz, W. 2016. Dopamine reward prediction-error signalling: a two-component response. Nature Reviews Neuroscience 17(3):183.

(Continued)

*Primary Examiner* — Mahmoud S Ismail
(74) *Attorney, Agent, or Firm* — Rankin, Hill & Clark LLP

(57) ABSTRACT

A system and method for implementing reward based strategies for promoting exploration that include receiving data associated with an agent environment of an ego agent and a target agent and receiving data associated with a dynamic operation of the ego agent and the target agent within the agent environment. The system and method also include implementing a reward function that is associated with exploration of at least one agent state within the agent environment. The system and method further include training a neural network with a novel unexplored agent state.

20 Claims, 5 Drawing Sheets

(56) References Cited

U.S. PATENT DOCUMENTS

2022/0083869 A1* 3/2022 Pascanu ............... G06N 3/006
2022/0092456 A1* 3/2022 Piot ..................... G06N 3/0454

OTHER PUBLICATIONS

Singh, S.; Barto, A.; and Chentanez, N. 2005. Intrinsically motivated reinforcement learning. In Advances in neural information processing systems, 1281-1288.

Singh, S.; Lewis, R. L.; Barto, A. G.; and Sorg, J. 2010. Intrinsically motivated reinforcement learning: An evolutionary perspective. IEEE Transactions on Autonomous Mental Development 2(2):70-82.

Still, S., and Precup, D. 2012. An information-theoretic approach to curiosity-driven reinforcement learning. Theory in Biosciences 131(3):139-148.

Tang, H.; Houthooft, R.; Foote, D.; Stooke, A.; Chen, O. X.; Duan, Y.; Schulman, J.; DeTurck, F.; and Abbeel, P. 2017. # exploration: A study of count-based exploration for deep reinforcement learning. In Advances in neural information processing systems, 2753-2762.

Thrun, S. B., and Möller, K. 1992. Active exploration in dynamic environments. In Advances in neural information processing systems, 531-538.

Thrun, S. 1995. Exploration in active learning. Handbook of Brain Science and Neural Networks 381-384.

Waelti, P.; Dickinson, A.; and Schultz, W. 2001. Dopamine responses comply with basic assumptions of formal learning theory. Nature 412(6842):43.

Wang, Z.; Bapst, V.; Heess, N.; Mnih, V.; Munos, R.; Kavukcuoglu, K.; and de Freitas, N. 2016. Sample efficient actor-critic with experience replay. arXiv preprint arXiv:1611.01224.

Watkins, C. J., and Dayan, P. 1992. Q-learning. Machine learning 8(3-4):279-292.

Wu, Y.; Mansimov, E.; Grosse, R. B.; Liao, S.; and Ba, J. 2017. Scalable trust-region method for deep reinforcement learning using kronecker-factored approximation. In Advances in neural information processing.

Wyatt, J. Exploration and inference in learning from reinforcement. 1998.

Andrychowicz, M.; Wolski, F.; Ray, A.; Schneider, J.; Fong, R.; Welinder, P.; McGrew, B.; Tobin, J.; Abbeel, P.; and Zaremba, W. 2017. Hindsight experience replay. Advances in Neural Information Processing Systems.

Auer, P.; Cesa-Bianchi, N.; Freund, Y.; and Schapire, R. E. 2002. The nonstochastic multiarmed bandit problem. SIAM journal on computing 32(1):48-77.

Baranes, A., and Oudeyer, P.-Y. 2013. Active learning of inverse models with intrinsically motivated goal exploration in robots. Robotics and Autonomous Systems 61(1):49-73.

Bellemare, M.; Srinivasan, S.; Ostrovski, G.; Schaul, T.; Saxton, D.; and Munos, R. 2016. Unifying count-based exploration and intrinsic motivation. In Advances in Neural Information Processing Systems, 1471-1479.

Bengio, Y.; Louradour, J.; Collobert, R.; and Weston, J. 2009. Curriculum learning. In Proceedings of the 26th annual international conference on machine learning, 41-48. ACM.

Burda, Y.; Edwards, H.; Pathak, D.; Storkey, A.; Darrell, T.; and Efros, A. A. 2018. Large-scale study of curiosity-driven learning. arXiv preprint arXiv:1808.04355.

Cheng, S., and Frank, L. M. 2008. New experiences enhance coordinated neural activity in the hippocampus. Neuron 57(2):303-313.

Cohn, D. A.; Ghahramani, Z.; and Jordan, M. I. 1996. Active learning with statistical models. Journal of artificial intelligence research 4:129-145.

Cui, Y.; Isele, D.; Niekum, S.; and Fujimura, K. 2019. Uncertainty-aware data aggregation for deep imitation learning. In IEEE International Conference on Robotics and Automation (ICRA).

Dayan, P., and Balleine, B. W. 2002. Reward, motivation, and reinforcement learning. Neuron 36(2):285-298.

Eysenbach, B.; Gupta, A.; Ibarz, J.; and Levine, S. 2018. Diversity is all you need: Learning skills without a reward function. arXiv preprint arXiv:1802.06070.

Forestier, S.; Mollard, Y.; and Oudeyer, P.-Y. 2017. Intrinsically motivated goal exploration processes with automatic curriculum learning. arXiv preprint arXiv:1708.02190.

Gal, Y., and Ghahramani, Z. 2016. Dropout as a bayesian approximation: Representing model uncertainty in deep learning. In international conference on machine learning, 1050-1059.

Graves, A., and Schmidhuber, J. 2005. Framewise phoneme classification with bidirectional lstm and other neural network architectures. Neural Networks 18(5-6):602-610.

Graves, A.; Bellemare, M. G.; Menick, J.; Munos, R.; and Kavukcuoglu, K. 2017. Automated curriculum learning for neural networks. In Proceedings of the 34th International Conference on Machine Learning—vol. 70, 1311-1320. JMLR. org.

Gregor, K.; Danihelka, I.; Graves, A.; Rezende, D. J.; and Wierstra, D. 2015. Draw: A recurrent neural network for image generation. arXiv preprint arXiv:1502.04623.

Gregor, K.; Rezende, D. J.; and Wierstra, D. 2016. Variational intrinsic control. arXiv preprint arXiv:1611.07507.

Haarnoja, T.; Zhou, A.; Abbeel, P., and Levine, S. Soft actor-critic: Off-policy maximum entropy deep reinforcement learning with a stochastic actor arXiv preprint arXiv:1801.01290, 2018.

Haber, N.; Mrowca, D.; Wang, S.; Fei-Fei, L. F.; and Yamins, D. L. 2018. Learning to play with intrinsically-motivated, self-aware agents. In Advances in Neural Information Processing Systems, 8388-8399.

Held, D.; Geng, X.; Florensa, C.; and Abbeel, P. 2018. Automatic goal generation for reinforcement learning agents. International Conference on Machine Learning (ICML).

Henderson, P.; Islam, R.; Bachman, P.; Pineau, J.; Precup, D.; and Meger, D. 2018. Deep reinforcement learning that matters. In Thirty-Second AAAI Conference on Artificial Intelligence.

Hester, T., and Stone, P. 2017. Intrinsically motivated model learning for developing curious robots. Artificial Intelligence 247:170-186.

Hochreiter, S., and Schmidhuber, J. 1997. Long short-term memory. Neural computation 9(8):1735-1780.

Houthooft, R.; Chen, X.; Duan, Y.; Schulman, J.; De Turck, F.; and Abbeel, P. 2016. Vime: Variational information maximizing exploration. In Advances in Neural Information Processing Systems, 1109-1117.

Isele, D., and Cosgun, A. 2018. Selective experience replay for lifelong learning. In Thirty-Second AAAI Conference on Artificial Intelligence.

Isele, D.; Eaton, E.; Roberts, M.; and Aha, D. W. 2018. Modeling consecutive task learning with task graph agendas. In Proceedings of the 17th International Conference on Autonomous Agents and MultiAgent Systems, 1965-1967. International Foundation for Autonomous Agents and Multiagent Systems.

Kim, Y.; Nam, W.; Kim, H.; Kim, J.-H.; and Kim, G. 2019. Curiosity-bottleneck: Exploration by distilling task-specific novelty. In International Conference on Machine Learning, 3379-3388.

Kumar, M. P.; Packer, B.; and Koller, D. 2010. Self-paced learning for latent variable models. In Advances in Neural Information Processing Systems, 1189-1197.

Lai, T. L., and Robbins, H. 1985. Asymptotically efficient adaptive allocation rules. Advances in applied mathematics 6(1):4-22.

Laversanne-Finot, A.; Péré, A.; and Oudeyer, P.-Y. 2018. Curiosity driven exploration of learned disentangled goal spaces. arXiv preprint arXiv:1807.01521.

Lillicrap, T. P., Hunt, J. J., Pritzel, A., Heess, N., Erez, T., Tassa, Y., Silver, D., and Wierstra, D. Continuous control with deep reinforcement learning. International Conference on Learning Representations (ICLR), 2016.

Lin, L.-J. Self-improving reactive agents based on reinforcement learning, planning and teaching. Machine learning, 1992.

(56) References Cited

OTHER PUBLICATIONS

Lopes, M.; Lang, T.; Toussaint, M.; and Oudeyer, P.-Y. 2012. Exploration in model-based reinforcement learning by empirically estimating learning progress. In Advances in Neural Information Processing Systems, 206-214.
McNamara, C. G.; Tejero-Cantero, Á.; Trouche, S.; Campo-Urriza, N.; and Dupret, D. 2014. Dopaminergic neurons promote hippocampal reactivation and spatial memory persistence. Nature neuroscience 17(12):1658-1660.
Mnih, V.; Kavukcuoglu, K.; Silver, D.; Graves, A.; Antonoglou, I.; Wierstra, D.; and Riedmiller, M. 2013. Playing atari with deep reinforcement learning. arXiv:1312.5602.
Mnih, V.; Badia, A. P.; Mirza, M.; Graves, A.; Lillicrap, T. P.; Harley, T.; Silver, D.; and Kavukcuoglu, K. 2016. Asynchronous methods for deep reinforcement learning. In International Conference on Machine Learning.
Murugesan, K., and Carbonell, J. 2017. Self-paced multitask learning with shared knowledge. arXiv preprint arXiv:1703.00977.
Narvekar, S., Sinapov, J., Leonetti, M., and Stone, P. Source task creation for curriculum learning. In Proceedings of the 2016 International Conference on Autonomous Agents & Multi-agent Systems, pp. 566-574. International Foundation for Autonomous Agents and Multiagent Systems, 2016.
O'Donoghue, B., Osband, I., Munos, R., and Mnih, V. The uncertainty bellman equation and exploration. arXiv preprint arXiv:1709.05380, 2017.
Osband, I., Doron, Y., Hessel, M., Aslanides, J., Sezener, E., Saraiva, A., McKinney, K., Lattimore, T., Szepezvari, C., Singh, S., et al. Behaviour suite for reinforcement learning. arXiv preprint arXiv:1908.03568, 2019.
Ostrovski, G.; Bellemare, M. G.; van den Oord, A.; and Munos, R. 2017. Count-based exploration with neural density models. In Proceedings of the 34th International Conference on Machine Learning—vol. 70, 2721-2730. JMLR. org.
Pathak, D.; Agrawal, P.; Efros, A. A.; and Darrell, T. 2017. Curiosity-driven exploration by self-supervised prediction. In International Conference on Machine Learning (ICML).
Pathak, D.; Gandhi, D.; and Gupta, A. 2019. Self-supervised exploration via disagreement. arXiv preprint arXiv:1906.04161.
Peters, M. E.; Neumann, M.; Iyyer, M.; Gardner, M.; Clark, C.; Lee, K.; and Zettlemoyer, L. 2018. Deep contextualized word representations. arXiv preprint arXiv:1802.05365.
Rybkin, O.; Pertsch, K.; Derpanis, K. G.; Daniilidis, K.; and Jaegle, A. 2019. Learning what you can do before doing anything. In International Conference on Learning Representations (ICLR).
Schaul, T.; Horgan, D.; Gregor, K.; and Silver, D. 2015. Universal value function approximators. In International conference on machine learning, 1312-1320.
Schaul, T.; Quan, J.; Antonoglou, I.; and Silver, D. 2016. Prioritized experience replay. International Conference on Learning Representations (ICLR).
Schmidhuber, J. 2010. Formal theory of creativity, fun, and intrinsic motivation (1990-2010). IEEE Transactions on Autonomous Mental Development 2(3):230-247.
Schulman, J.; Levine, S.; Abbeel, P.; Jordan, M.; and Moritz, P. 2015. Trust region policy optimization. In International conference on machine learning, 1889-1897.
Schulman, J.; Wolski, F.; Dhariwal, P.; Radford, A.; and Klimov, O. 2017. Proximal policy optimization algorithms. arXiv preprint arXiv:1707.06347.

\* cited by examiner

SYSTEM AND METHOD FOR IMPLEMENTING REWARD BASED STRATEGIES FOR PROMOTING EXPLORATION

CROSS-REFERENCE TO RELATED APPLICATION

This application claims priority to U.S. Provisional Application Ser. No. 62/897,242 filed on Sep. 6, 2019, which is expressly incorporated herein by reference.

BACKGROUND

Exploration strategies have been related to curiosity, general intelligence, and overcoming technical limitations in reinforcement learning. Many exploration strategies that model control accuracy, dynamic distributions, and prediction error try to model a behavior of a system and use the disparities in accurately modeling autonomous behavior as a means of determining novelty. Models of variation have been used with the intention of maximizing the diversity of behaviors. Diverse actions have also been formulated as intrinsically motivated goal exploration. However, in many instances there is little to no incentive to explore novel situations with respect to autonomous behaviors in one or more environments.

BRIEF DESCRIPTION

According to one aspect, a computer-implemented method for implementing reward based strategies for promoting exploration that includes receiving data associated with an agent environment of an ego agent and a target agent and receiving data associated with a dynamic operation of the ego agent and the target agent within the agent environment. The computer-implemented method also includes implementing a reward function that is associated with exploration of at least one agent state within the agent environment. The reward function includes assigning at least one reward based on if the at least one agent state is a novel unexplored agent state or a previously explored agent state. The computer-implemented method further includes training a neural network with the novel unexplored agent state. At least one simulation is processed to determine at least one additional novel unexplored agent state based on an analysis of at least one reward of the reward function.

According to another aspect, a system for implementing reward based strategies for promoting exploration that includes a memory storing instructions when executed by a processor cause the processor to receive data associated with an agent environment of an ego agent and a target agent and receive data associated with a dynamic operation of the ego agent and the target agent within the agent environment. The instructions also cause the processor to implement a reward function that is associated with exploration of at least one agent state within the agent environment. The reward function includes assigning at least one reward based on if the at least one agent state is a novel unexplored agent state or a previously explored agent state. The instructions further cause the processor to train a neural network with the novel unexplored agent state. At least one simulation is processed to determine at least one additional novel unexplored agent state based on an analysis of at least one reward of the reward function.

According to yet another aspect, a non-transitory computer readable storage medium storing instructions that when executed by a computer, which includes a processor perform a method that includes receiving data associated with an agent environment of an ego agent and a target agent and receiving data associated with a dynamic operation of the ego agent and the target agent within the agent environment. The method also includes implementing a reward function that is associated with exploration of at least one agent state within the agent environment. The reward function includes assigning at least one reward based on if the at least one agent state is a novel unexplored agent state or a previously explored agent state. The method further includes training a neural network with the novel unexplored agent state. At least one simulation is processed to determine at least one additional novel unexplored agent state based on an analysis of at least one reward of the reward function.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
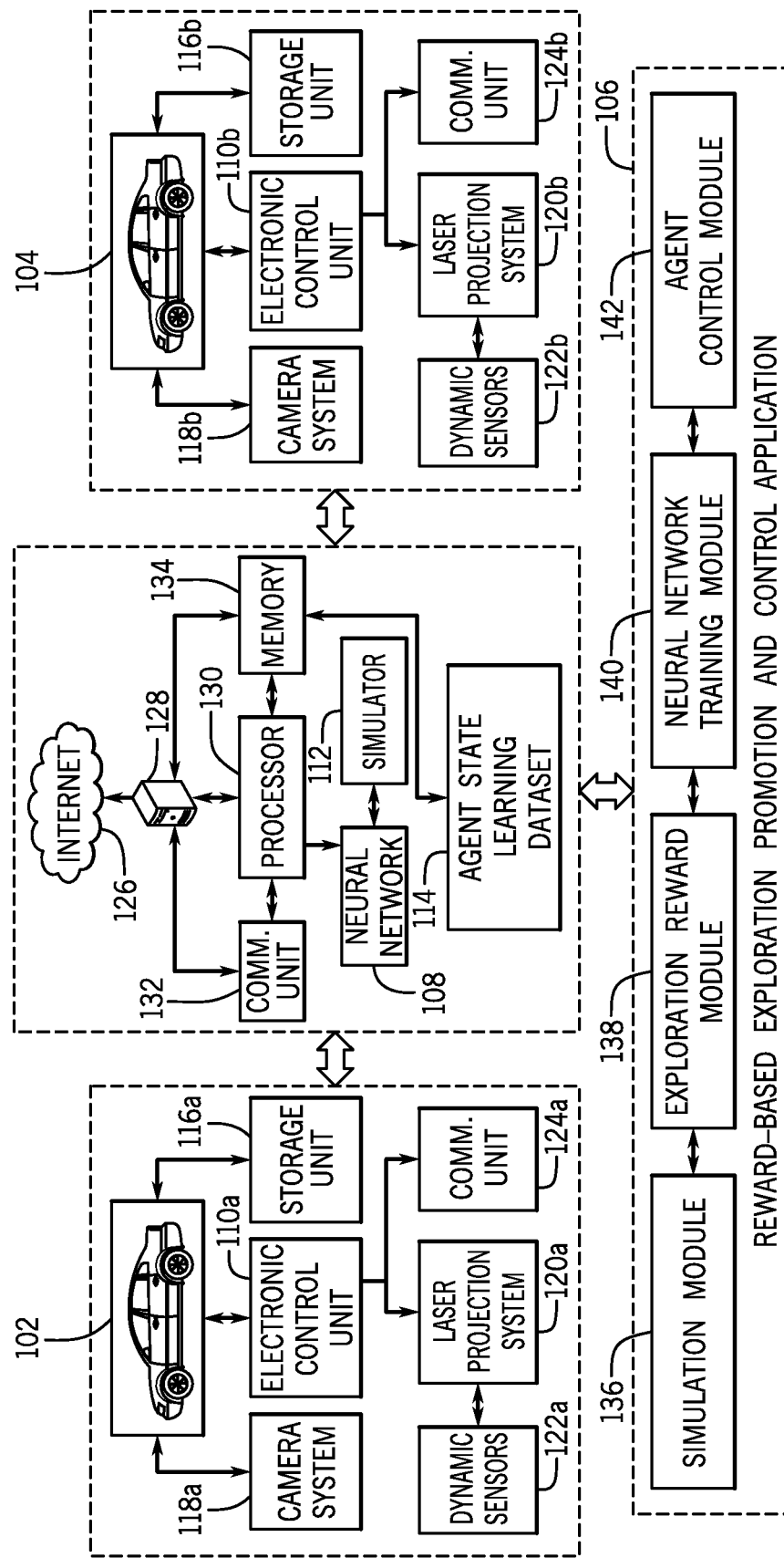
FIG. 1 is a schematic view of an exemplary system for implementing reward based strategies for promoting exploration according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. SYSTEM OVERVIEW

Referring now to the drawings, wherein the showings are for purposes of illustrating one or more exemplary embodiments and not for purposes of limiting same, FIG. 1 is a schematic view of an exemplary system 100 for implementing reward based strategies for promoting exploration according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego agent 102 and a target agent 104. In one or more configurations, the ego agent 102 and/or the target agent 104 may include, but may not be limited to, an automobile, a robot, a forklift, a bicycle/motor bike, a wheel chair/scooter, a construction crane, an airplane, and the like that may be traveling within one or more types of agent environments. For purposes of simplicity, this disclosure will describe the embodiments of the system 100 with respect to a single ego agent 102 and a single target agent 104. However, it is appreciated that the system 100 may include more than one ego agent 102 and more than one target agent 104 and that the embodiments and processes discussed herein may be utilized in an environment that includes one or more ego agents 102 and one or more target agents 104.

Figure 2:
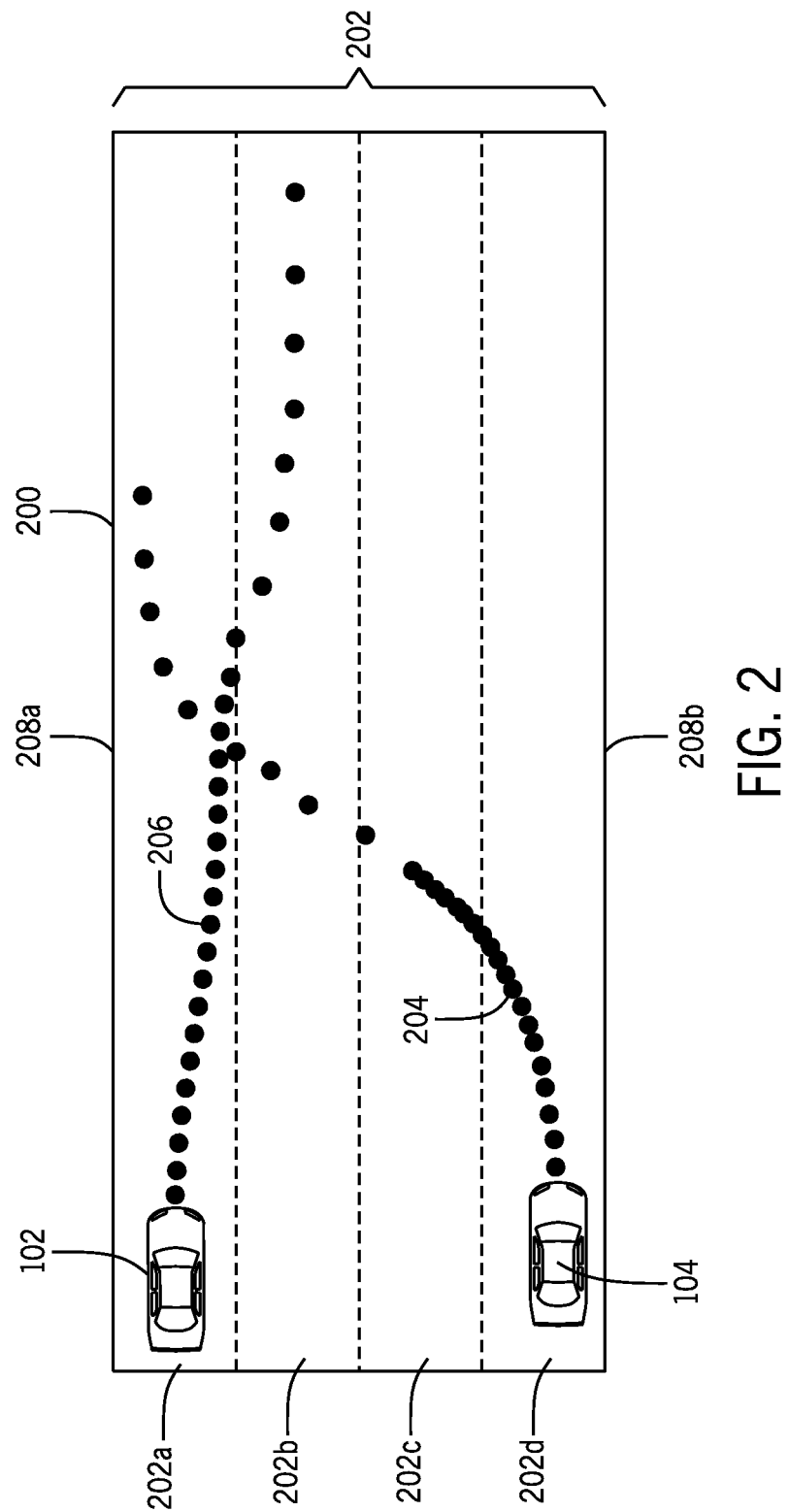
FIG. 2 is an illustrative example of an agent environment according to an exemplary embodiment of the present disclosure.

As shown in the illustrative example of FIG. 2, the ego agent 102 and the target agent 104 may be traveling in an agent environment 200. In one embodiment, the agent environment 200 may include, but may not be limited to areas that are evaluated to provide navigable pathways for the ego agent 102 and/or the target agent 104 that are traveling on a roadway 202, as shown in the illustrative example of FIG. 2. In additional embodiments, one or more agent environments may include, but may not be limited to, additional types of roadways such as a narrow street or tunnel and/or a pathway that may exist within a confined location such as a factory floor, a construction site, or an airport taxiway, a public space.

With respect to the agent environment 200 of FIG. 2, the ego agent 102 and the target agent 104 may be traveling within adjacent lanes of the roadway 202. The ego agent 102 and the target agent 104 may be traveling in respective directions and in locations that are within a particular distance of one another. In some examples, the ego agent 102 and/or the target agent 104 may be traveling at respective speeds, at respective directions, and may be located at respective positions.

As discussed below, data associated with the agent environment 200 and the respective dynamic operations associated with the ego agent 102 and the target agent 104 may be received and analyzed to determine agent states that may be associated with the ego agent 102 and the target agent 104 traveling to one or more intended locations. The agent states may be determined at a current time step and one or more discrete future time steps based on the prediction of one or more dynamic operations that may be implemented and the configuration of the agent environment 200 at one or more future time steps. It is to be appreciated that the agent environment 200 may be configured to independently include the ego agent 102 and/or the target agent 104 or include both the single agent 102 and the target agent 104 and may possibly include additional agents, static objects, and/or dynamic objects. However, for purposes of simplicity, the exemplary embodiments and examples discussed herein will mainly be described with reference to the agent environment 200 that includes the roadway 202, the ego agent 102, and the target agent 104, as shown in the illustrative example of FIG. 2.

With reference again to FIG. 1, in an exemplary embodiment, the system 100 may include a reward-based exploration promotion and control application 106 (exploration promotion application 106). The exploration promotion application 106 may be configured to promote the training of a neural network 108 based on the exploration of agent states associated with the ego agent 102 and the target agent 104. The agent states may include data associated with the dynamic operation of the respective agent 102, 104 and environmental attributes associated with the agent environment 200 at one or more discrete time steps.

In particular, the exploration promotion application 106 may be configured to utilize a simulator 110 of the neural network 108 to execute one or more automated simulated models (simulations) of the agent environment 200 along with the operation of the ego agent 102 and the target agent 104 within the agent environment 200 based on real-time sensor based data received by the exploration promotion application 106.

In one or more configurations, the simulations executed by the simulator 110 of the neural network 108 may be associated with the dynamic operation of the ego agent 102 and the target agent 104 with respect to various positions of the ego agent 102, various positions of the target agent 104, various maneuvers that may be completed by the ego agent 102, various maneuvers that may be completed by the target agent 104, and/or various simulated environmental attributes of the agent environment 200. The environmental attributes of the agent environment 200 that may be simulated may include various types of roadway settings that include different types of roadways. For example, the different types of roadways may include a single lane roadway, a double lane roadway, a highway, an intersection, a merge lane, a crosswalk, and one or more sections of the roadway that may include particular angles of curvatures and/or inclines. The environmental attributes may also include the inclusion of one or more objects that may be located within the agent environment 200 that may include, one or more static objects such as traffic cones, curbs, street signs, guardrails, and/or one or more dynamic objects that may include pedestrians and additional agents.

In one embodiment, the simulation of the agent environment 200 may be based on a real-world agent environment in which the ego agent 102 and the target agent 104 are virtually represented at one or more discrete time steps. The simulation may be determined based on image data and/or LiDAR data that may be provided to the application 106 by one or more components of the ego agent 102 and/or the target agent 104. For example, the simulation may include lanes 202a, 202d on which the ego agent 102 and the target agent 104 are traveling in addition to lanes 202b, 202c that fall between the lanes 202a, 202d on which the ego agent 102 and the target agent 104 are traveling in the real-world agent environment 200, as shown in FIG. 2.

As discussed below, the exploration promotion application 106 may communicate with the neural network 108 to utilize the simulator 110 to perform machine learning/deep learning methods to provide artificial intelligence capabilities to execute a plurality of simulations with respect to the dynamic operation of the ego agent 102 and/or the dynamic operation of the target agent 104 within the agent environment 200 that may be configured as including one or more environmental attributes to determine one or more novel unexplored agent states that may be associated with the ego agent 102 and/or the target agent 104 that have not been previously trained to the neural network 108.

The exploration promotion application 106 may utilize the simulator 110 to process simulations that pertain to dynamic operations and environmental attributes to train the neural network 108 by building and adding to an agent state learning dataset 114. The agent state learning dataset 114 may be built as a reinforcement trained knowledgebase that may be accessed by the neural network 108 to execute machine learning/deep learning techniques to provide artificial intelligence capabilities. Each of the simulations may be analyzed by the application 106 to determine if one or more agent states associated with the ego agent 102 and/or the target agent 104 that pertain to the dynamic operations of the ego agent 102, the dynamic operations of the target agent 104, and/or one or more environmental attributes associated with the agent environment 200 may be recognized as previously explored and trained to the neural network 108 based on the analysis of the agent state learning dataset 114. Additionally, each of the simulations executed by the simulator 110 may be analyzed by the application 106 to determine if one or more agent states associated with the ego agent 102 and/or the target agent 104 that are associated with the ego agent 102 and/or the target agent 104 that pertain to the dynamic operations of the ego agent 102, the dynamic operations of the target agent 104, and/or one or more environmental attributes associated with the agent environment 200 may not be recognized as previously explored and trained to the neural network 108 based on the analysis of the agent state learning dataset 114.

As discussed in more detail below, the exploration promotion application 106 may be configured to implement reward based strategies to promote exploration of novel unexplored agent states (e.g., agent states that have not been trained to the neural network 108) associated with the dynamic operation of the ego agent 102, the dynamic operation of the target agent 104, and the agent environment 200 that may be associated with one or more environmental attributes. In particular, the exploration promotion application 106 may be configured to promote the simulator 110 to execute simulations that may be processed to determine additional unexplored agent states associated with the ego agent 102 and/or the target agent 104.

In one configuration, rewards may be associated to specific agent states. Such rewards may promote the simulator 110 to simulate dynamic operations of the ego agent 102, dynamic operations of the target agent 104, and/or environmental attributes associated with the agent environment 200 that may incrementally (e.g., slightly, by a particular degree) vary with respect to the simulated dynamic operations of the ego agent 102, the simulated dynamic operations of the target agent 104, and/or the simulated environmental attributes associated with the agent environment 200 of previously determined novel unexplored agent states. This functionality may thereby promote expanded exploration strategies to further train the neural network 108 with respect to a plurality of novel unexplored operational and environmental scenarios associated with the agents 102, 104 and their operation within one or more configurations of the agent environment 200.

As discussed below, the neural network 108 may be configured to process agent states by predicting future agent states associated with the ego agent 102 and the target agent 104. As shown in FIG. 2, each future agent state may pertain to predicted dynamic operations associated with each of the agents 102, 104, including but not limited to, a trajectory, a position, a speed, a turning angle, a braking rate, and the like of each of the agents 102, 104 at one or more future time steps. The future agent states may also pertain to environmental attributes associated with the configuration of the agent environment 200, including but not limited to, the roadway configuration (e.g., number of lanes, angle of curvature and/or incline of the roadway 202, type of roadway 202), one or more static objects, one or more dynamic objects, and the like at the one or more future time steps.

The application 106 may utilize the neural network 108 to predict the agent states as a competence measure for active exploration. Each predicted agent state may be appended to inputs associated with current dynamic data associated with the ego agent 102 and the target agent 104 and environmental data associated with the agent environment 200. The application 106 may utilize the neural network 108 to thereby analyze the current agent state and each predicted agent state associated with the ego agent 102 and the target agent 104 to determine if each agent state has been previously explored or unexplored based on if data associated with the respective agent state is included within the agent state learning dataset 114. In other words, the application 106 may analyze each respective agent state to determine if the neural network 108 has been previously trained with the respective agent state that includes the dynamic operation of the respective agent 102, 104 and the environmental attributes of the agent environment 200 at one or more time steps or has not yet been trained with the respective agent state that includes the dynamic operation of the respective agent 102, 104 and the environmental attributes of the agent environment 200 at the one or more time steps.

As discussed below, the exploration promotion application 106 may implement numerous types of reward functions aimed at conveying information about novelty with respect to training of the agent states associated with the ego agent 102 and/or the target agent 104. The application 106 may implement the reward functions to provide a reinforcement learning setting that promotes the simulator 110 to simulate various dynamic operations within various configurations of the agent environment 200 that may be associated with various environmental attributes. The reward functions may promote the exploration of novel unexplored agent states to further train the neural network 108 by expanding the agent state learning dataset 114. Accordingly, the exploration promotion application 106 may promote reinforcement learning to further train the neural network 108 with novel unexplored agent states that may be associated with various vehicle dynamics of each of the agents 102, 104 and various environmental attributes of the agent environment 200. This may result in an expanded knowledgebase of the neural network 108 to thereby enable the exploration promotion application 106 to autonomously control the ego agent 102 and/or the target agent 104 in various operational and environmental scenarios.

In one or more embodiments, in a real-world scenario, the exploration promotion application 106 may be configured to analyze the current agent states associated with the ego agent 102 and/or the target agent 104 and may communicate with the neural network 108 to obtain trained data associated with one or more agent states that may executed by the ego agent 102 and/or the target agent 104 within the real-world agent environment 200. Accordingly, the trained data associated with one or more agent states as provided by the neural network 108 may be utilized by the application 106 to autonomously control the ego agent 102 and/or the target agent 104 within the agent environment 200 and/or similar agent environments that include similar driving and environmental scenarios to navigate the ego agent 102 and the target agent 104 to perform one or more maneuvers to travel to intended locations of the agent environment 200 without any overlap with respect to the paths of the agents 102, 104 with one another, dynamic objects, static objects, and in accordance with the environmental attributes associated with the agent environment 200.

With continued reference to FIG. 1, the ego agent 102 and the target agent 104 may include respective electronic control devices (ECUs) 110a, 110b. The ECUs 110a, 110b may execute one or more applications, operating systems, vehicle system and subsystem executable instructions, among others. In one or more embodiments, the ECUs 110a, 110b may include a respective microprocessor, one or more application-specific integrated circuit(s) (ASIC), or other similar devices. The ECUs 110a, 110b may also include respective internal processing memory, an interface circuit, and bus lines for transferring data, sending commands, and communicating with the plurality of components of the ego agent 102 and/or the target agent 104.

The ECUs 110a, 110b may also include a respective communication device (not shown) for sending data internally to components of the respective agents 102, 104 and communicating with externally hosted computing systems (e.g., external to the agents 102, 104). Generally, the ECUs 110a, 110b communicate with respective storage units 114a, 114b to execute the one or more applications, operating systems, vehicle systems and subsystem user interfaces, and the like that are stored within the respective storage units 114a, 114b.

The respective storage units 114a, 114b of the ego agent 102 and the target agent 104 may also be configured to store one or more executable files associated with one or more operating systems, applications, associated operating system data, application data, vehicle system and subsystem user interface data, and the like that are executed by the respective ECUs 110a, 110b. In one or more embodiments, the storage units 114a, 114b may be accessed by the exploration promotion application 106 to store data, for example, one or more images, videos, one or more sets of image coordinates, one or more sets of LiDAR coordinates (e.g., LiDAR coordinates associated with the position of an object), one or more sets of locational coordinates (e.g., GPS/DGPS coordinates) and/or vehicle dynamic data associated respectively with the ego agent 102 and the target agent 104. As discussed below, such data may be utilized to determine the configuration of the agent environment 200 and real-time dynamic data associated with the operation of the ego agent 102 and the target agent 104 within the agent environment 200.

In an exemplary embodiment, the ECUs 110a, 110b may be configured to operably control the plurality of components of the respective agents 102, 104. The ECUs 110a, 110b may additionally provide one or more commands to one or more control units (not shown) of the agents 102, 104 including, but not limited to a respective engine control unit, a respective braking control unit, a respective transmission control unit, a respective steering control unit, and the like to control the ego agent 102 and/or target agent 104 to be autonomously operated.

In an exemplary embodiment, one or both of the ECUs 110a, 110b may autonomously control the ego agent 102 and/or the target agent 104 within the agent environment 200 and/or similar multi-agent environments that include similar driving and environmental scenarios to respectively navigate the ego agent 102 and/or the target agent 104 to perform one or more maneuvers to travel to intended locations of the agent environment 200 based on trained agent states that may be stored and retrieved from the agent state learning dataset 114 of the neural network 108.

In one or more embodiments, the ECUs 110a, 110b may be additionally configured to operably control respective camera systems 118a, 118b of the ego agent 102 and the target agent 104. The camera systems 118a, 118b may include one or more cameras that are positioned at one or more exterior portions of the respective agents 102, 104. The camera(s) of the camera systems 118a, 118b may be positioned in a direction to capture the surrounding environment of the respective agents 102, 104 that includes a predetermined area located around (front/sides/behind) the respective agents 102, 104 within the agent environment 200.

In one or more configurations, the one or more cameras of the respective camera systems 118a, 118b may be disposed at external front, rear, and/or side portions of the respective agents 102, 104 including, but not limited to different portions of the bumpers, lighting units, fenders/body panels, and/or windshields. The one or more cameras may be positioned on a respective planar sweep pedestal (not shown) that allows the one or more cameras to be oscillated to capture images of the surrounding environments of the respective agents 102, 104.

With respect to the ego agent 102, the exploration promotion application 106 may receive image data associated with untrimmed images/video of the surrounding environment of the ego agent 102 from the camera system 118a and may execute image logic to analyze the image data and determine ego agent image based observations associated with the agent environment 200, one or more target agents 104 that may be located within the agent environment 200, one or lanes 202a-202d (pathways) within the agent environment 200, and/or one or more static and/or additional dynamic objects (e.g., additional agents, pedestrians, animals, etc.) that may be located within the agent environment 200.

With respect to the target agent 104, the exploration promotion application 106 may receive image data associated with untrimmed images/video of the surrounding environment of the target agent 104 from the camera system 118b and may execute image logic to analyze the image data and determine target agent image based observations associated with the agent environment 200, the ego agent 102 that may be located within the agent environment 200, one or lanes 202a-202d (pathways) within the agent environment 200, and/or one or more dynamic objects and/or additional static objects that may be located within the agent environment 200.

In one or more embodiments, the ECUs 110a, 110b may also be operably connected to respective laser projection systems 120a, 120b that may include one or more respective LiDAR transceivers (not shown). The one or more respective LiDAR transceivers of the respective laser projection systems 120a, 120b may be disposed at respective external front, rear, and/or side portions of the respective agents 102, 104, including, but not limited to different portions of bumpers, body panels, fenders, lighting units, and/or windshields.

The one or more respective LiDAR transceivers may include one or more planar sweep lasers that may be configured to oscillate and emit one or more laser beams of ultraviolet, visible, or near infrared light toward the surrounding environment of the respective agents 102, 104. The laser projection systems 120a, 120b may be configured to receive one or more reflected laser waves based on the one or more laser beams emitted by the LiDAR transceivers. The one or more reflected laser waves may be reflected off of one or more boundaries 212a, 212b (e.g., guardrails) of the agent environment 200, and/or one or more static and/or dynamic objects (e.g., other agents, cones, pedestrians, etc.) that may be located within the agent environment 200.

In an exemplary embodiment, the laser projection systems 120a, 120b may be configured to output LiDAR data associated to one or more reflected laser waves. With respect to the ego agent 102, the exploration promotion application 106 may receive LiDAR data communicated by the laser projection system 120a and may execute LiDAR logic to analyze the LiDAR data to determine ego agent LiDAR based observations associated with the agent environment 200, and more specifically the lane 202a on which the ego agent 102 is traveling, additional lanes 202b-202d included within the agent environment 200, one or more target agents 104 that may be located within the agent environment 200, one or more boundaries 212a, 212b of the agent environment 200, and/or one or more static objects and/or dynamic objects that may be located within the agent environment 200.

With respect to the target agent 104, the exploration promotion application 106 may receive LiDAR data communicated by the laser projection system 120b and may execute LiDAR logic to analyze the LiDAR data and determine target agent LiDAR based observations associated with the agent environment 200, and more specifically the lane 202d on which the target agent 104 is traveling, additional lanes 202a-202c included within the agent environment 200, the ego agent 102 that may be located within the agent environment 200, one or more boundaries 212a, 212b of the agent environment 200, and/or one or more static objects and/or dynamic objects that may be located within the agent environment 200.

In one or more embodiments, the ego agent 102 and the target agent 104 may additionally include respective dynamic sensors 122a, 122b that output sensed dynamic data associated with the ego agent 102 and the target agent 104. In one embodiment, the dynamic sensors 122a, 122b may be configured to receive inputs from one or more vehicle systems, sub-systems, control systems, and the like. The dynamic sensors 122a, 122b may be included as part of a respective Controller Area Network (CAN) of the ego agent 102 and the target agent 104 and may be configured to provide vehicle dynamic data to the respective ECUs 110a, 110b to be utilized for one or more vehicle systems, sub-systems, control systems, and the like. The dynamic sensors 122a, 122b may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one or more embodiments, the dynamic sensors 122a, 122b may output sensed dynamic data that may include real-time data associated with the dynamic operation of the ego agent 102 and the target agent 104 at a current time stamp t. In one configuration, the sensed dynamic data may pertain to current states of the ego agent 102 and the target agent 104 respectively. In particular, the sensed dynamic data may pertain to the dynamic operation of the ego agent 102 and the target agent 104 respectively as the agents 102, 104 are operating and conducting maneuvers within the agent environment 200. As discussed below, the sensed dynamic data, the image data, and/or the LiDAR data for the ego agent 102 and the target agent 104 may be analyzed to determine the current agent state of the ego agent 102 and the target agent 104. As discussed below, the current agent states of the agents 102, 104 may be utilized by the simulator 110 to process predicted states of the agents 102, 104 to further utilize reward based reinforcement learning based on the simulations of the operations of the agents 102, 104 within various configurations of the agent environment 200.

In one embodiment, the communication units 124a, 124b of the ego agent 102 and the target agent 104 may be configured to connect to the internet cloud 126 to send and receive communication signals to and from an externally hosted server infrastructure (external server) 128. The external server 128 may host the neural network 108 and may execute the exploration promotion application 106 to utilize processing power to promote the training of the neural network 108 with unexplored agent states.

In particular, the neural network 108 may be configured as a recurrent neural network such as a long term short term memory neural network (LTSM) that may be configured to classify, process, and make predictions based on time series data. In one embodiment, the neural network 108 may be trained at one or more time steps with data associated with novel unexplored current agent states and/or novel unexplored predicted agent states associated with the ego agent 102 and/or the target agent 104 based on the plurality of simulations that are processed by the simulator 110 of the neural network 108. The training of the neural network 108 may allow the agents 102, 104 to receive data pertaining to real-time or similar agent scenarios (e.g., ego agent 102 and target agent 104 located with respect to one another) that may occur within the agent environment 200 to ensure reinforcement learning techniques. Such reinforcement learning techniques may be utilized by exploration promotion application 106 to enable the ego agent 102 and/or the target agent 104 to travel to intended locations of the agent environment 200 in a cooperative non-conflicting manner while accounting for one another within the agent environment 200.

In an exemplary embodiment, components of the external server 128 including the neural network 108 may be operably controlled by a processor 130. The processor 130 may be configured to operably control the neural network 108 to utilize machine learning/deep learning to provide artificial intelligence capabilities that may be utilized to build the agent state learning dataset 114.

With continued reference to the external server 128, the processor 130 may be operably connected to a memory 134. The memory 134 may store one or more operating systems, applications, associated operating system data, application data, executable data, and the like. In one embodiment, the processor 130 may be configured to process information associated with the agent states at one or more time steps that may be utilized to train the neural network 108 by updating the agent state learning dataset 114 stored on the memory 134.

In one or more embodiments, the agent state learning dataset 114 may be configured as a dataset that includes one or more fields associated with each of the ego agent 102 and the target agent 104 that include the current agent state (at one or more particular time steps) and one or more predicted agent states (at one or more future time steps predicted ahead of the respective current time steps). As discussed, the agent states may include data pertaining to vehicle dynamics data associated with particular trajectories, positions, speeds, acceleration rates, steering angles, deceleration rates, braking rates, and the like that may be determined to be utilized by the ego agent 102 and/or the target agent 104. The agent states may also include data pertaining to the environmental attributes associated with the configuration of the agent environment 200 including but not limited to, the configuration of the roadway 202, such as the lanes 202a-202d of the roadway 202 of the agent environment 200, and boundaries 208a, 208b of the roadway 202 of the agent environment 200, the curvature and/or incline of the roadway 202, the type of roadway 202, additional attributes of the roadway (e.g., intersection, on/off-ramps), one or more static objects and/or one or more dynamic objects at one or more time steps.

In one embodiment, the processor 130 of the external server 128 may additionally be configured to communicate with a communication unit 132. The communication unit 132 may be configured to communicate through the internet cloud 126 through one or more wireless communication signals that may include, but may not be limited to Bluetooth® signals, Wi-Fi signals, ZigBee signals, Wi-Max signals, and the like. In one embodiment, the communication unit 132 may be configured to connect to the internet cloud 126 to send and receive communication signals to and from the ego agent 102 and/or the target agent 104. In particular, the external server 128 may receive image data, LiDAR data, and dynamic data that may be communicated by the ego agent 102 and/or the target agent 104 based on the utilization of one or more of the camera systems 118a, 118b, the laser projection systems 120a, 120b, and the dynamic sensors 122a, 122b.

As discussed below, such data may be utilized to determine simulated agent environment 200 that pertains to the real-world agent environment 200 and the simulated operation of the ego agent 102 and the target agent 104 within the simulated agent environment 200 to determine one or more agent states. The agent states may thereby be analyzed to determine if particular agent states are explored or unexplored and the reward structure may be implemented to promote further exploration of unexplored agent states.

II. THE REWARD-BASED EXPLORATION PROMOTION AND CONTROL APPLICATION AND RELATED METHODS

The components of the exploration promotion application 106 will now be described according to an exemplary embodiment and with reference to FIG. 1. In an exemplary embodiment, the exploration promotion application 106 may be stored on the memory 134 and executed by the processor 130 of the external server 128. In another embodiment, the exploration promotion application 106 may be stored on the storage unit 114a of the ego agent 102 and may be executed by the ECU 110a of the ego agent 102. In some embodiments, in addition to be stored and executed by the external server 128 and/or by the ego agent 102, the application 106 may also be executed by the ECU 110b of the target agent 104.

The general functionality of the exploration promotion application 106 will now be discussed. In an exemplary embodiment, the exploration promotion application 106 may include a simulation module 136, an exploration reward module 138, a neural network training module 140, and an agent control module 142. However, it is to be appreciated that the exploration promotion application 106 may include one or more additional modules and/or sub-modules that are included in addition to the modules 134-140. Methods and examples describing process steps that are executed by the modules 134-140 of the exploration promotion application 106 will now be described in more detail.

Figure 3:
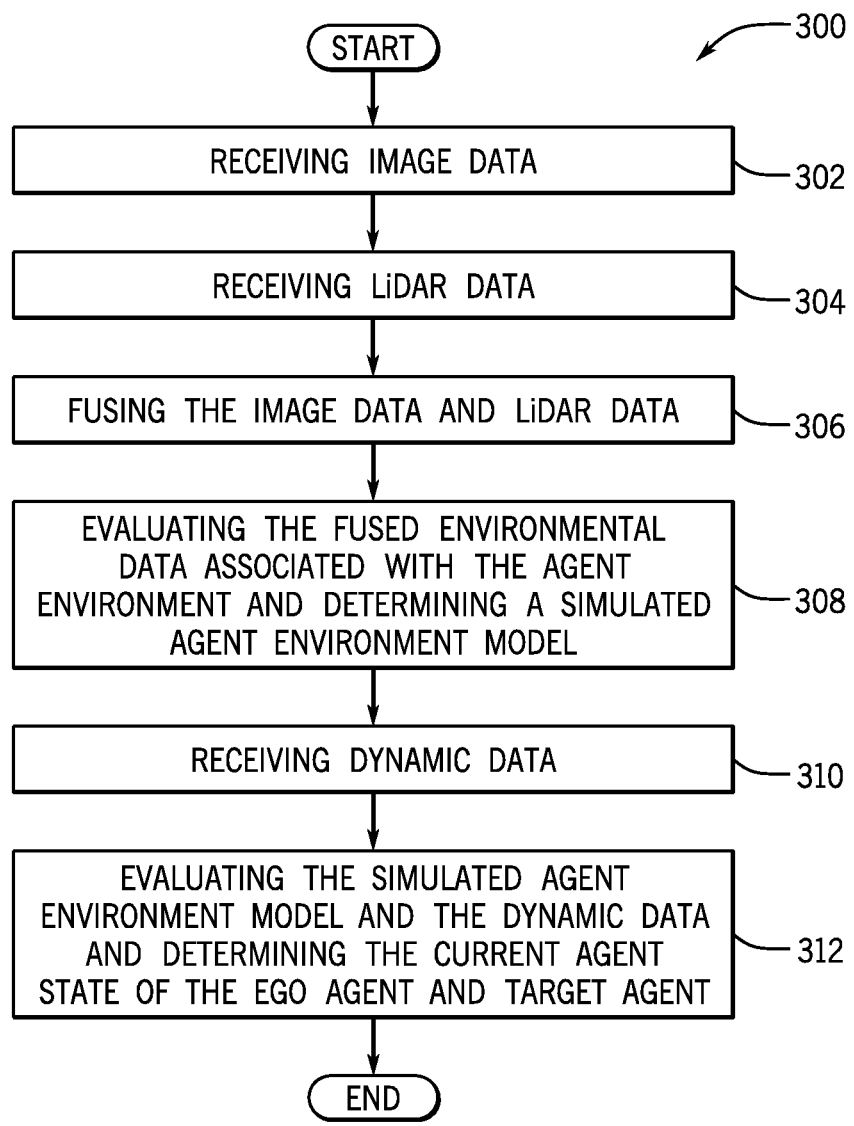
FIG. 3 is a process flow diagram of a method for determining a simulated agent environment model and processing a current agent state of the ego agent and the target agent according to an exemplary embodiment of the present disclosure.

FIG. 3 is a process flow diagram of a method 300 for determining a simulated agent environment model and processing a current agent state of the ego agent 102 and the target agent 104 according to an exemplary embodiment of the present disclosure. FIG. 3 will be described with reference to the components of FIG. 1 and FIG. 2, though it is to be appreciated that the method of FIG. 3 may be used with other systems/components.

As discussed above, the simulated model may be determined by the application 106 as a virtual representation (e.g., virtual model) of the agent environment 200 to be utilized to analyze one or more agent states associated with the ego agent 102 and the target agent 104 at one or more time steps. In particular, the simulated model may be determined by the application 106 as a virtual world model of the real-world agent environment 200 that is utilized to implement reward functions associated with explored and/or novel unexplored agent states.

In an exemplary embodiment, the method 300 may begin at block 302, wherein the method 300 may include receiving image data. In one embodiment, the simulation module 136 of the exploration promotion application 106 may be configured to communicate with the camera system 118a of the ego agent 102 and/or the camera system 118b of the target agent 104 to collect untrimmed images/video of the surrounding environment of the agents 102, 104. The untrimmed images/video may include a 360 degree external views of the surrounding environments of the agents 102, 104 that includes the agent environment 200.

With reference to the illustrative example of FIG. 2, from the perspective of the ego agent 102, such views may include observations of the ego agent 102 that include the target agent 104. Additionally, from the perspective of the target agent 104, such views may include observations of the target agent 104 that include the ego agent 102. In one or more circumstances, the observations may also include additional environmental attributes associated with the agent environment 200, including, but not limited to, the configuration of the roadway 202, such as the lanes 202a-202d of the roadway 202 of the agent environment 200, and boundaries 208a, 208b of the roadway 202 of the agent environment 200, the curvature and/or incline of the roadway 202, the type of roadway 202, additional attributes of the roadway (e.g., intersection, on/off-ramps), one or more static objects and/or one or more dynamic objects. In one embodiment, the simulation module 136 may package and store the image data received from the camera system 118a and/or the image data received from the camera system 118b on the memory 134 of the external server 128 to be further evaluated by the simulation module 136.

The method 300 may proceed to block 304, wherein the method 300 may include receiving LiDAR data. In an exemplary embodiment, the simulation module 136 may communicate with the laser projection system 120a of the ego agent 102 and/or the laser projection system 120b of the target agent 104 to collect LiDAR data that includes LiDAR based observations from the ego agent 102 and/or the target agent 104. The LiDAR based observations may indicate the location, range, and positions of the one or more objects off which the reflected laser waves were reflected with respect to a location/position of the respective agents 102, 104.

With reference again to FIG. 2, from the perspective of the ego agent 102, the simulation module 136 may communicate with the laser projection system 120a of the ego agent 102 to collect ego agent LiDAR based observations that classifies sets of LiDAR coordinates that are associated with the target agent 104. Additionally, from the perspective of the target agent 104, the simulation module 136 may communicate with the laser projection system 120b of the target agent 104 to collect target agent LiDAR based observations that classifies sets of LiDAR coordinates that are associated with the ego agent 102 of the agent environment 200.

In one or more circumstances, the observations may also include additional environmental attributes associated with the agent environment 200, including, but not limited to, the configuration of the roadway 202, such as the lanes 202a-202d of the roadway 202 of the agent environment 200, and boundaries 208a, 208b of the roadway 202 of the agent environment 200, the curvature of the roadway 202, the type of roadway 202, additional attributes of the roadway (e.g., intersection, on/off-ramps), one or more static objects and/or one or more dynamic objects that may be located within the agent environment 200.

In one embodiment, the simulation module 136 may package and store the ego agent LiDAR based observations received from the laser projection system 120a and/or the target agent LiDAR based observations received from the laser projection system 120b on the memory 134 of the external server 124 to be further evaluated by the simulation module 136. In one or more circumstances, the LiDAR based observations may also include additional environmental attributes associated with the agent environment 200, including, but not limited to, the configuration of the roadway 202, the curvature of the roadway 202 that may be defined by the boundaries 208a, 208b of the roadway 202, and/or additional attributes of the roadway (e.g., intersection, on/off-ramps), one or more static objects and/or one or more dynamic objects.

The method 300 may proceed to block 306, wherein the method 300 may include fusing the image data and LiDAR data. In an exemplary embodiment, the simulation module 136 may communicate with the neural network 108 to provide artificial intelligence capabilities to conduct multi-modal fusion of the image data received from the camera system 118a of the ego agent 102 and/or the camera system 118b of the target agent 104 with the LiDAR data received from the laser projection system 120a of the ego agent 102 and/or the laser projection system 120b of the target agent 104. The simulation module 136 may aggregate the image data and the LiDAR data into fused environmental data that is associated with the agent environment 200 to be evaluated further by the simulation module 136.

In particular, the simulation module 136 may communicate with the neural network 108 to provide artificial intelligence capabilities to utilize one or more machine learning/deep learning fusion processes to aggregate the image data received from the camera system 118a of the ego agent 102 and the image data received from the camera system 118b of the target agent 104 into aggregated image data. Similarly, the simulation module 136 may communicate with the neural network 108 to provide artificial intelligence capabilities to utilize one or more machine learning/deep learning fusion processes to aggregate the LiDAR data received by the laser projection system 120a of the ego agent 102 and the LiDAR data received by the laser projection system 120b of the target agent 104b into aggregated LiDAR data. The simulation module 136 may additionally be configured to aggregate the aggregated image data and the aggregated LiDAR data into environmental data that includes one or more environmental attributes associated with the agent environment 200. Accordingly, the ego agent image based observations and LiDAR based observations of the agent environment 200 may be aggregated with the target agent image based observations and LiDAR based observations of the agent environment 200 to determine the environmental attributes that are associated with the agent environment 200.

The method 300 may proceed to block 308, wherein the method 300 may include evaluating the fused environmental data associated with the agent environment 200 and determining a simulated agent environment model. In an exemplary embodiment, the simulation module 136 may communicate with the neural network 108 to utilize one or more machine learning/deep learning fusion processes to evaluate the fused environmental data to determine one or more sets of environmental coordinates that are based on the aggregated observations of the ego agent 102 and the target agent 104. The one or more sets of environmental coordinates may include positional coordinates (e.g., x, y grid world coordinates) that represent the ego agent 102, the target agent 104, the boundaries of the agent environment 200, the roadway configuration (e.g., number of lanes, angle of curvature and/or incline of the roadway 202, type of roadway 202), one or more static objects, one or more dynamic objects, and the like to process the simulated agent environment.

The simulated agent environment model may include a virtual ego agent that represents the ego agent 102 and a virtual target agent that represents the target agent 104 along with virtual markers that may represent lanes 202a-202d on a roadway 202 of the agent environment 200, the boundaries 208a, 208b of the agent environment 200, one or more static objects, one or more dynamic objects, and the like. The simulated agent environment model may also include the configuration of the roadway 202, the curvature and/or incline of the roadway 202, the type of roadway 202, and additional attributes of the roadway (e.g., intersection, on/off-ramps).

The method 300 may proceed to block 310, wherein the method 300 may include receiving dynamic data. In an exemplary embodiment, the simulation module 136 may communicate with the dynamic sensors 122a of the ego agent 102 and the dynamic sensors 122b of the target agent 104 to collected dynamic data associated with the dynamic operation of the ego agent 102 and the dynamic operation of the target agent 104. The dynamic data may include a trajectory, a position, a speed, a turning angle, a braking rate, and the like of each of the agents 102, 104 at the current time step.

The method 300 may proceed to block 312, wherein the method 300 may include evaluating the simulated agent environment model and the dynamic data and determining the current agent state of the ego agent 102 and the target agent 104. In an exemplary embodiment, the simulation module 136 may be configured to evaluate the simulated agent environment to determine environmental attributes associated with the agent environment 200. The environmental attributes may include but may not be limited to, the roadway configuration such as the current lane of the ego agent 102, the current lane of the target agent 104, the number of lanes, the angle of curvature and/or incline of the roadway 202, the type of roadway 202. The environmental attributes may also include one or more static objects, one or more dynamic objects, and their respective positions and locations within the agent environment 200 that may be included at the current time step.

Upon determining the environmental attributes associated with the agent environment 200, the simulation module 136 may analyze the dynamic data associated with the ego agent 102 and/or the target agent 104 that may include the trajectory, a position, a speed, a turning angle, a braking rate, and the like of each of the agents 102, 104 at the current time step. The simulation module 136 may be configured to thereby package the environmental attributes and the dynamic data associated with the ego agent 102 into a current agent state of the ego agent 102 (data package that includes dynamic data and environmental attributes). Additionally, the simulation module 136 may be configured to package the environmental attributes and the dynamic data associated with the target agent 104 into a current agent state of the target agent 104. The current agent states of the ego agent 102 and the target agent 104 may pertain to one or more dynamic operations of the ego agent 102 and/or the target agent 104 and one or more environmental attributes associated with the agent environment 200.

Figure 4:
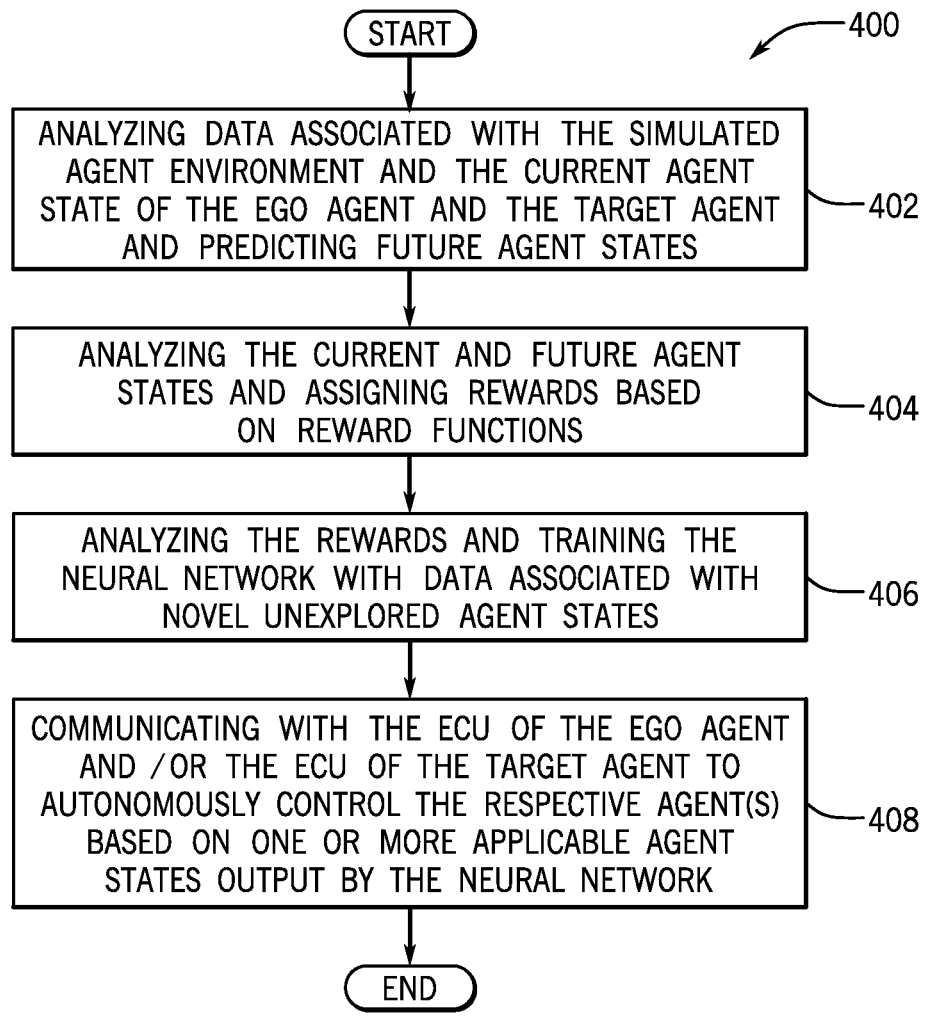
FIG. 4 is a process flow diagram of a method for executing reward functions to promote exploration and training of the neural network according to an exemplary embodiment of the present disclosure.

FIG. 4 is a process flow diagram of a method 400 for executing reward functions to promote exploration and training of the neural network 108 according to an exemplary embodiment of the present disclosure. FIG. 4 will be described with reference to the components of FIG. 1 and FIG. 2, though it is to be appreciated that the method of FIG. 4 may be used with other systems/components. The method 400 may begin at block 402, wherein the method 400 may include analyzing data associated with the simulated agent environment 200 and the current agent state of the ego agent 102 and the target agent 104 and predicting future agent states.

In an exemplary embodiment, the simulation module 136 may communicate data pertaining to the current agent state of the ego agent 102 and the current agent state of the target agent 104 to the exploration reward module 138 of the exploration promotion application 106. Upon receipt of the data, the exploration reward module 138 may analyze the respective current agent states of the ego agent 102 and the target agent 104 and may determine dynamic operational data associated with the particular agent state, environmental attributes associated with the current agent environment 200, and determine actions that pertain to maneuvers that are associated with the current operation of the agents 102, 104 within the agent environment 200. The exploration promotion application 106 may thereby predict future agent states of the ego agent 102 and the target agent 104.

In particular, upon analyzing the respective current agent states of the ego agent 102 and the target agent 104 and determining particular agent environmental attributes associated with the current agent environment 200 and determining actions that are associated with the current operation of the agents 102, 104 within the agent environment 200, the exploration reward module 138 may communicate with the neural network 108 to process the prediction of one or more future agent states that pertain to future dynamic operations of the ego agent 102 and the target agent 104 and future environmental attributes associated with the agent environment 200.

In one embodiment, the neural network 108 may execute a predictor (not shown) $f(\mathcal{S}_t, \alpha_t)$ of the LTSM that may take each agent state $\mathcal{S}_t$ and action $\alpha_t$ at current time t and may predict a future agent state $\mathcal{S}_{t+1}$ at a subsequent future time step t+1. The predictor may append the input of predicted future agent state $\mathcal{S}_{t+1}$ at the subsequent future time step t+1 to infer future information $f(\mathcal{S}_t, \alpha_t, \mathcal{S}_{t-1}, \alpha_{t-1}, \ldots)$ pertaining to dynamic operations and environmental attributes for one or more subsequent future agent states. The predicted state $\mathcal{S}_{t+1}$ at the subsequent future time step t+1 may thereby be appended to the input for subsequent predictions for multiple time steps into the future $f(\mathcal{S}_t, \alpha_t, \mathcal{S}_{t-1}, \alpha_{t-1}, \ldots) \to \mathcal{S}_{t+1}, \ldots, \mathcal{S}_{t+k}$, given the true values $\chi = \mathcal{S}_{t+1}, \ldots, \mathcal{S}_{t+k}$ and the predicted values $\hat{\chi} = \hat{\mathcal{S}}_{t+1}, \ldots, \hat{\mathcal{S}}_{t+k}$. The network is trained using the loss $\mathcal{L} = (\chi - \hat{\chi})^2$.

The predicted future agent states may thereby include, but may not be limited to, predicted respective speeds of the agents 102, 104, predicted respective trajectories of the agents 102, 104, predicted respective positions of the agents 102, 104, predicted respective braking rates of the agents 102, 104, and additional predicted respective dynamic parameters that may pertain to the dynamic operation of respective components of the agents 102, 104 (e.g., engine, transmission, etc.). The predicted future states may additionally include environmental attributes associated with the agent environment 200 that may include the roadway configuration (e.g., number of lanes, angle of curvature and/or incline of the roadway 202, type of roadway 202), positions of one or more static objects that may be located within the agent environment 200, positions one or more dynamic objects that may be located within the agent environment 200, and the like at each future time step associated with the agent environment 200 from the point of view of the respective agents 102, 104.

In one embodiment, the neural network 108 may evaluate the confidence of the predictions of one or more agent states. In particular, the neural network 108 my evaluate a variance of predictions and may use the variance as a competence measure. The neural network 108 may thereby select actions to maximize the variance: $\alpha_t = \max [\text{var}(\hat{\chi})]$ which may correspond to minimizing competence. The exploration reward module 138 may thereby enable the neural network 108 to be driven toward predicting future agent states where future actions of the ego agent 102 and/or the target agent 104 have more influence. This functionality may skew the simulator 112 to avoid prediction of actions that are not well explored and may lead to predictions with low variance.

With continued reference to FIG. 4, upon predicted future agent states associated with the ego agent 102 and the target agent 104, the method 400 may proceed to block 404, wherein the method 400 may include analyzing the current and future agent states and assigning rewards based on reward functions. In an exemplary embodiment, the exploration reward module 138 may implement minimally informative rewards to avoid a bias against exploring certain agent states since the impact of future actions may be state dependent. In one embodiment, the exploration reward module 138 may be configured to analyze the current agent state and the predicted future states of the ego agent 102 and the target agent 104 to extract data associated with the current and predicted dynamic operation of the ego agent 102, the current and predicted dynamic operation of the target agent 104, and the current and predicted environmental attributes associated with the agent environment 200 at each time step.

In an exemplary embodiment, upon extracting the dynamic operations of the agents 102, 104 and the predicted environmental attributes associated with the agent environment 200 at each time step, the exploration reward module 138 may determine dynamic parameters associated with the current and predicted dynamic operators of the ego agent 102 and the target agent 104. Such dynamic parameters may include the current and future predicted respective speeds of the agents 102, 104, current and future predicted respective trajectories of the agents 102, 104, current and future predicted respective positions of the agents 102, 104, current and future predicted respective braking rates of the agents 102, 104, and additional current and future predicted respective dynamic parameters that may pertain to the dynamic operation of respective components of the agents 102, 104 (e.g., engine, transmission, etc.). In one configuration, the dynamic parameters may be represented as values (e.g., measurement values) that may respectively pertain to each of the aforementioned categories of the dynamic operations of the ego agent 102 and the target agent 104.

The exploration reward module 138 may further determine environmental parameters associated with the current and predicted environmental attributes associated with the agent environment 200. Such environmental attributes may include the current and future predicted roadway configuration (e.g., number of lanes, angle of curvature and/or incline of the roadway 202, type of roadway 202), the current and future existence and positions one or more static objects, the current and future existence of one or more dynamic objects, and the like at each future time step. In one configuration, the environmental parameters may be represented as values (e.g., measurement values) that may pertain to each of the aforementioned categories of the environmental attributes associated with the agent environment 200.

In one embodiment, upon determining the dynamic parameters and environmental parameters associated with the current and predicted agent states of the ego agent 102 and the target agent 104, the exploration reward module 138 may communicate the environmental parameters and the dynamic parameters to the neural network 108 to determine if one or more of the agent states have been previously explored or are novel unexplored agent states with respect to prior training of the neural network 108. In other words, the exploration reward module 138 may communicate with the neural network 108 to determine if the neural network 108 has been previously trained with the dynamic parameters and environmental parameters that may be associated with the dynamic operation of the agents 102, 104 and the environmental attributes associated with the agent environment 200 at the current time step and as predicted for one or more future time steps.

In one or more embodiments, upon receipt of the dynamic parameters and environmental parameters, the neural network 108 may query the agent state learning dataset 114 to determine if the dataset 114 had been previously trained with the current agent state and/or one or more of the predicted agent states. In particular, the neural network 108 may query the agent state learning dataset 114 to determine if the dataset 114 had been previously updated with the dynamic parameters and environmental parameters associated with the current agent state and one or more of the predicted agent states. In one configuration, the neural network 108 may thereby communicate an indication to the exploration reward module 138 as to if the neural network 108 has been previously trained with the current agent state and/or one or more predicted agent states.

In one configuration, the indication may be communicated as a Boolean value (1,0) that may indicate if the neural network 108 has been previously trained with the current agent state and/or one or more predicted agent states. In one configuration, the neural network 108 may communicate an indication of '1' if the current agent state and/or a particular predicted agent state(s) is a previously explored agent state such that the respective dynamic parameters and environmental parameters have been previously updated to the agent state learning dataset 114 to previously train the neural network 108. Additionally, the neural network 108 may communicate an indication of '0' if the current agent state and/or a particular predicted agent state(s) is a novel unexplored agent state such that the respective dynamic parameters and environmental parameters have not been previously updated to the agent state learning dataset 114, such that the neural network 108 is untrained with respect to the respective agent state.

In an alternate embodiment, the indication may be communicated as a record locator value that may be associated with records of explored agent states within the agent state learning dataset 114. The indication may also be communicated as a null value that may be associated with the novel unexplored agent states indicating that there are no records including data associated with the unexplored agent states within the agent state learning dataset 114.

In one embodiment, the exploration reward module 138 may implement an explored-or-not binary reward function (EON). The EON may be implemented as a minimally informative reward function that may be aimed at conveying an intentionally small amount of information about novelty with respect to the current and future predicted agent states. In one configuration, the exploration reward module 138 may analyze the indication associated with each of the agent states as communicated by the neural network 108 and per the EON and may assign a negative reward '−1' to the agent states that are determined to be previously visited and explored. For example, if the indication is a Boolean value of '1' with respect to a particular agent state, the EON may assign a negative reward '−1' to the agent state.

Per the EON, the exploration reward module 138 may assign a zero reward '0' to the agent states that are determined to be novel and unexplored. For example, if the indication is a Boolean value of '0' with respect to a particular agent state, the EON may assign a zero reward '0' to the agent state. The EON reward function may be defined as:

$$r = \begin{cases} -1, & \text{if previously visited} \\ 0, & \text{if novel.} \end{cases}$$

considering the definition of the value function $V)\mathcal{S}_0) = \mathcal{r}_0 + \gamma \mathcal{r}_1 + \ldots + \gamma^{T-1} \mathcal{r}_T$. The negative rewards may be utilized by the exploration reward module 138 to prevent agents from oscillating between two adjacent states that both have positive reward. Accordingly, the flat reward structure of the EON may function to create a potential landscape in the value space where unexplored regions are in the basin of attraction for the simulator 112.

In an alternate embodiment, the exploration reward module 138 may implement a maximum reward function with respect to the novel unexplored agent states. The maximum reward function may impose a gradient in value space. The exploration reward module 138 may thereby implement a count based exploration method:

$$\mathcal{r} = \beta \mathcal{N}(\mathcal{S}, \alpha)^{-1/2}$$

where $\mathcal{N}(\mathcal{S}, \alpha)$ is the number of times action $\alpha$ has been taken in state $\mathcal{S}$, and $\beta$ is a constant. The count based exploration method may allow allocation of a most positive reward with respect to novel unexplored agents to thereby prompt the simulator 112 to explore additional novel unexplored agent states.

In one embodiment, during implementation of the maximum reward function, the exploration reward module 138 may analyze the current agent state by determining that each agent 102, 104 begins each trajectory from the start position $\mathcal{S}_0$ and travels a trajectory with a fixed horizon length $T$ and that transitioning to a novel unexplored agent states yields a reward $\mathcal{r}_{max}$, where $\mathcal{r}_{min} < \mathcal{r}_{max} \leq 0$. The value of novel agent states is initialized to $\mathcal{r}_{max}$. Accordingly, the exploration reward module 138 may analyze the indication associated with each of the agent states as communicated by the neural network 108 and per the EON and may assign $\mathcal{r}_{max}$ maximum reward for novel unexplored agent states and $\mathcal{r}_{min}$ minimum reward for explored agent states.

Since there are a finite number of agent states, after substantial time, previously explored agent states with reward $\mathcal{r}_{min}$ may be determined. In other words, the neural network 108 may be trained with respect to the plurality of agent states associated with the ego agent 102 and the target agent 104 and their operation within the agent environment 200. This means that the value associated with $\mathcal{S}_0$ is $V(\mathcal{S}_0) = \mathcal{r}_{min} + \gamma \mathcal{r}_{min} + \gamma^2 \mathcal{r}_{min} + \ldots + \gamma^{T-1} \mathcal{r}_{min}$ is reachable and there is a sequence of states of size m+1 that reach the unvisited state $\{\mathcal{S}_{u-m}, \ldots, \mathcal{S}_{u-1}, \mathcal{S}_u\}$.

In an additional embodiment, the exploration reward module 138 may implement a noisy explored-or-not reward function (NEON) that may include a minimal amount of information concerning whether a particular agent state is a novel unexplored agent state or an explored agent state. In this configuration, the exploration reward module 138 may implement the reward as an even less informative reward to decouple the reward from a reinforcement learning process. The exploration reward module 138 may implement such a reward using a uniformly random distribution with a negative mean value of '−1' such that the reward may be implemented as:

$$r = \begin{cases} \text{uniform}\{0, -2\} & \text{if previously visited} \\ 0 & \text{if novel} \end{cases}$$

where the NEON reward function may produce a gradient towards exploring novel unexplored agent states.

In another embodiment, the exploration reward module 138 may implement a noise reward function that may include a zero mean which matches a binary indication communicated by the neural network 108 that may be associated with the exploration of a novel unexplored agent state. The reward may be implemented as:

$$r = \begin{cases} \text{uniform}\{-1, 1\} & \text{if previously visited} \\ 0 & \text{if novel} \end{cases}$$

In one embodiment, upon determining the rewards using one or more of the aforementioned reward functions, the exploration reward module 138 may be configured to communicate rewards to the simulator 112. The simulator 112 may be configured to analyze the rewards and process simulations that may explore additional agent states that may be based on the rewarded novel unexplored agent states. In one configuration, the simulator 112 may simulate additional agent states that include dynamic operations of the ego agent 102, dynamic operations of the target agent 104, and/or environmental attributes associated with the agent environment 200 that may incrementally vary with respect to the simulated dynamic operations of the ego agent 102, the simulated dynamic operations of the target agent 104, and/or the simulated environmental attributes associated with the agent environment 200 that may be included within rewarded novel unexplored agent states to thereby determine one or more additional novel unexplored agent states. This functionality may thereby promote expanded exploration strategies to further train the neural network 108 with respect to a plurality of novel unexplored operational and environmental scenarios associated with the agents 102, 104 and the agent environment 200.

With reference again to FIG. 4, upon assigning rewards based on the reward functions, the method 400 may proceed to block 406, wherein the method 400 may include analyzing the rewards and training the neural network 108 with data associated with novel unexplored agent states. In an exemplary embodiment, upon assigning rewards based on the reward functions, the exploration reward module 138 may communicate rewards and information pertaining to one or more associated agent states to the neural network training module 140 of the exploration promotion application 106. The neural network training module 140 may be configured to analyze the rewards and determine one or more novel unexplored agent states that have not been previously trained to the neural network 108.

In one embodiment, the neural network training module 140 may be configured to extract dynamic parameters associated with the dynamic operators of the ego agent 102 and the target agent 104 included within the respective novel unexplored agent states. Such dynamic parameters may include the respective speeds of the agents 102, 104, the respective trajectories of the agents 102, 104, the respective positions of the agents 102, 104, the respective braking rates of the agents 102, 104, and additional respective dynamic parameters that may pertain to the dynamic operation of respective components of the agents 102, 104. The neural network training module 140 may further extract environmental parameters pertaining to the environmental attributes associated with the agent environment 200 included within the respective novel unexplored agent states. Such environmental attributes may include the roadway configuration, the current and future existence and positions one or more static objects, the current and future existence of one or more dynamic objects, and the like.

Upon extracting the dynamic parameters and the environmental parameters, the neural network training module 140 may be configured to communicate with the neural network 108 to access the agent state learning dataset 114. Upon accessing the agent state learning dataset 114, the neural network training module 140 may be configured to create a new record that may be associated with the novel unexplored agent state. The neural network training module 140 may be configured to populate the new record associated with the novel unexplored agent state with the dynamic parameters and environmental parameters of the unexplored agent state to thereby train the neural network 108 with respect to the particular agent state. Accordingly, in future instances the particular agent state may be determined to be an explored agent state that has been previously updated within the agent state learning dataset 114 to previously train the neural network 108.

The method 400 may proceed to block 408, wherein the method 400 may include communicating with the ECU 110*a* of the ego agent 102 and/or the ECU 110*b* of the target agent 104 to autonomously control the respective agent(s) based on one or more applicable agent states output by the neural network 108. In an exemplary embodiment, within the real-world agent environment 200, the agent control module 142 may communicate with the simulation module 136 to receive data associated with the current agent state of the ego agent 102 and the target agent 104. The agent control module 142 may be configured to communicate with the neural network 108 to query the agent state learning dataset 114 to select one or more agent states that may be applicable to autonomously control the ego agent 102 and/or the target agent 104 to perform one or more maneuvers (e.g., the maneuvers 204, 206) to travel to intended locations of the agent environment 200 without any overlap with respect to the paths of the agents 102, 104 with one another, dynamic objects, static objects, and in accordance with the environmental attributes associated with the agent environment 200. In particular, the one or more agent states may include predicted dynamic parameters and predicted environmental parameters that may be analyzed to autonomously control the ego agent 102 and/or the target agent 104 to navigate within the real-world agent environment 200.

In an exemplary embodiment, upon receiving one or more agent states that may be selected by the neural network 108, the agent control module 142 may thereby communicate with the ECU 110*a* of the ego agent 102 and/or the ECU 110*b* of the target agent 104 to autonomously control the ego agent 102 and/or the target agent 104 to be autonomously (or semi-autonomously) operated (e.g., driven) within the agent environment 200 according to the one or more selected agent states. The ECU(s) 110*a*, 110*b* may communicate with one or more of the respective systems/control units (not shown) to thereby control the ego agent 102 and/or the target agent 104 to perform one or more maneuvers (e.g., the maneuvers 204, 206) to travel to intended locations of the agent environment 200 without any overlap with respect to the paths of the agents 102, 104 with one another, dynamic objects, static objects, and in accordance with the environmental attributes (e.g., type of roadway, number of lanes, navigable pathways) associated with the agent environment 200.

Figure 5:
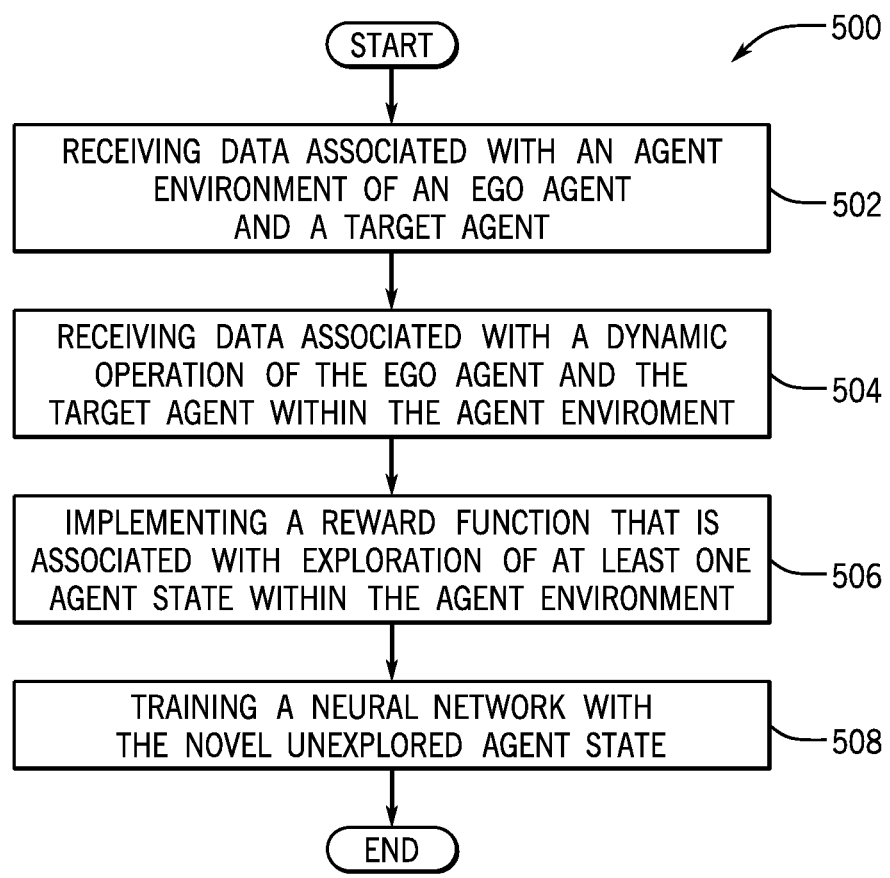
FIG. 5 is a process flow diagram of a method for implementing reward based strategies for promoting exploration according to an exemplary embodiment of the present disclosure.

FIG. 5 is a process flow diagram of a method 500 for implementing reward based strategies for promoting exploration according to an exemplary embodiment of the present disclosure. FIG. 5 will be described with reference to the components of FIG. 1 and FIG. 2, though it is to be appreciated that the method of FIG. 5 may be used with other systems/components. The method 500 may begin at block 502, wherein the method 500 may include receiving data associated with an agent environment 200 of an ego agent 102 and a target agent 104. The method 500 may proceed to block 504, wherein the method 500 may include receiving data associated with a dynamic operation of the ego agent 102 and the target agent 104 within the agent environment 200.

The method 500 may proceed to block 506, wherein the method 500 may include implementing a reward function that is associated with exploration of at least one agent state within the agent environment 200. In an exemplary embodiment, the reward function includes assigning at least one reward based on if the at least one agent state is a novel unexplored agent state or a previously explored agent state. The method 500 may proceed to block 508, wherein the method 500 may include training a neural network 108 with the novel unexplored agent state. In one embodiment, at least one simulation is processed to determine at least one additional novel unexplored agent state based on an analysis of at least one reward of the reward function.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for implementing reward based strategies for promoting exploration comprising:
  receiving data associated with an agent environment of an ego agent and a target agent;
  receiving data associated with a dynamic operation of the ego agent and the target agent within the agent environment;
  implementing a reward function that is associated with exploration of at least one agent state within the agent environment, wherein the reward function includes assigning at least one reward based on if the at least one agent state is a novel unexplored agent state or a previously explored agent state; and
  training a neural network with the novel unexplored agent state, wherein at least one simulation is processed to determine at least one additional novel unexplored agent state based on an analysis of at least one reward of the reward function.

2. The computer-implemented method of claim 1, wherein receiving data associated with the agent environment includes receiving image data and LiDAR data from at least one of the: ego agent and the target agent, wherein the image data and the LiDAR data are fused to determine a simulated agent environment model that pertains to the agent environment at a current time step.

3. The computer-implemented method of claim 2, wherein receiving data associated with the agent environment includes receiving dynamic data associated with the ego agent and dynamic data associated with the target agent, wherein the dynamic data is analyzed to determine the dynamic operation of the ego agent and the target agent within the agent environment at the current time step.

4. The computer-implemented method of claim 3, further including evaluating the simulated agent environment model and the dynamic data and determining current agent states of the ego agent and the target agent, wherein the current agent states of the ego agent and the target agent pertain to the dynamic operation of the ego agent, the dynamic operation of the target agent, and environmental attributes that are associated with the agent environment at the current time step.

5. The computer-implemented method of claim 4, wherein implementing the reward function that is associated with the exploration of the at least one agent state includes predicting future agent states associated with the ego agent and the target agent that pertain to a trajectory and a speed of the ego agent and the target agent during at least one future time step, wherein the current agent states and actions at the current time step are analyzed to infer future information pertaining to dynamic operations and environmental attributes for the future agent states.

6. The computer-implemented method of claim 1, wherein implementing the reward function that is associated with the exploration of the at least one agent state includes analyzing the at least one agent state using a explored-or-not binary reward function, wherein a negative reward is assigned to at least one agent state that is determined to be the previously explored agent state and a zero reward is assigned to at least one agent state that is determined to be the novel unexplored agent state.

7. The computer-implemented method of claim 1, wherein implementing the reward function that is associated with the exploration of the at least one agent state includes analyzing the at least one agent state using a maximum reward function, wherein a minimum reward value is assigned to at least one agent state that is determined to be the previously explored agent state and a maximum reward value is assigned to at least one agent state that is determined to be the novel unexplored agent state.

8. The computer-implemented method of claim 1, wherein implementing the reward function that is associated with the exploration of the at least one agent state includes analyzing the at least one agent state using a noisy explored-or-not reward function, wherein a negative mean value reward is assigned to at least one agent state that is determined to be the previously explored agent state and a zero reward is assigned to at least one agent state that is determined to be the novel unexplored agent state.

9. The computer-implemented method of claim 1, further including autonomously controlling at least one of the ego agent and the target agent based on agent states that are determined with respect to a simulated agent environment model, wherein at least one of the ego agent and the target agent are autonomously controlled to perform at least one maneuver to travel to an intended location of the agent environment.

10. A system for implementing reward based strategies for promoting exploration comprising:
a memory storing instructions when executed by a processor cause the processor to:
receive data associated with an agent environment of an ego agent and a target agent;
receive data associated with a dynamic operation of the ego agent and the target agent within the agent environment;
implement a reward function that is associated with exploration of at least one agent state within the agent environment, wherein the reward function includes assigning at least one reward based on if the at least one agent state is a novel unexplored agent state or a previously explored agent state; and
train a neural network with the novel unexplored agent state, wherein at least one simulation is processed to determine at least one additional novel unexplored agent state based on an analysis of at least one reward of the reward function.

11. The system of claim 10, wherein receiving data associated with the agent environment includes receiving image data and LiDAR data from at least one of the: ego agent and the target agent, wherein the image data and the LiDAR data are fused to determine a simulated agent environment model that pertains to the agent environment at a current time step.

12. The system of claim 11, wherein receiving data associated with the agent environment includes receiving dynamic data associated with the ego agent and dynamic data associated with the target agent, wherein the dynamic data is analyzed to determine the dynamic operation of the ego agent and the target agent within the agent environment at the current time step.

13. The system of claim 12, further including evaluating the simulated agent environment model and the dynamic data and determining current agent states of the ego agent and the target agent, wherein the current agent states of the ego agent and the target agent pertain to the dynamic operation of the ego agent, the dynamic operation of the target agent, and environmental attributes that are associated with the agent environment at the current time step.

14. The system of claim 13, wherein implementing the reward function that is associated with the exploration of the at least one agent state includes predicting future agent states associated with the ego agent and the target agent that pertain to a trajectory and a speed of the ego agent and the target agent during at least one future time step, wherein the current agent states and actions at the current time step are analyzed to infer future information pertaining to dynamic operations and environmental attributes for the future agent states.

15. The system of claim 10, wherein implementing the reward function that is associated with the exploration of the at least one agent state includes analyzing the at least one agent state using a explored-or-not binary reward function, wherein a negative reward is assigned to at least one agent state that is determined to be the previously explored agent state and a zero reward is assigned to at least one agent state that is determined to be the novel unexplored agent state.

16. The system of claim 10, wherein implementing the reward function that is associated with the exploration of the at least one agent state includes analyzing the at least one agent state using a maximum reward function, wherein a minimum reward value is assigned to at least one agent state that is determined to be the previously explored agent state and a maximum reward value is assigned to at least one agent state that is determined to be the novel unexplored agent state.

17. The system of claim 10, wherein implementing the reward function that is associated with the exploration of the at least one agent state includes analyzing the at least one agent state using a noisy explored-or-not reward function, wherein a negative mean value reward is assigned to at least one agent state that is determined to be the previously explored agent state and a zero reward is assigned to at least one agent state that is determined to be the novel unexplored agent state.

18. The system of claim 10, further including autonomously controlling at least one of the ego agent and the target agent based on agent states that are determined with respect to a simulated agent environment model, wherein at least one of the ego agent and the target agent are autonomously controlled to perform at least one maneuver to travel to an intended location of the agent environment.

19. A non-transitory computer readable storage medium storing instructions that when executed by a computer, which includes a processor perform a method, the method comprising:
receiving data associated with an agent environment of an ego agent and a target agent;
receiving data associated with a dynamic operation of the ego agent and the target agent within the agent environment;
implementing a reward function that is associated with exploration of at least one agent state within the agent environment, wherein the reward function includes assigning at least one reward based on if the at least one agent state is a novel unexplored agent state or a previously explored agent state; and
training a neural network with the novel unexplored agent state, wherein at least one simulation is processed to determine at least one additional novel unexplored agent state based on an analysis of at least one reward of the reward function.

20. The non-transitory computer readable storage medium of claim 19, further including autonomously controlling at least one of the ego agent and the target agent based on agent states that are determined with respect to a simulated agent environment model, wherein at least one of the ego agent and the target agent are autonomously controlled to perform at least one maneuver to travel to an intended location of the agent environment.

* * * * *